Dec. 29, 1953   A. L. BERGSTROM   2,664,325
FLOATING TYPE ROLLER BEARING
Filed Dec. 21, 1950

INVENTOR.
ALBERT L. BERGSTROM
BY *Carr & Carr & Gravely*
ATTORNEYS

Patented Dec. 29, 1953

2,664,325

UNITED STATES PATENT OFFICE 2,664,325

FLOATING TYPE ROLLER BEARING

Albert L. Bergstrom, Canton, Ohio, assignor to The Timken Roller Bearing Company, Canton, Ohio, a corporation of Ohio Application December 21, 1950, Serial No. 202,039

2 Claims. (Cl. 308—214)

This invention relates to improvements in floating type roller bearings, and it is an object hereof to provide a roller bearing which will permit axial adjustment between the inner and outer bearing members without impairing the ability of the bearing to carry radial load.

It is also an object of this invention to provide an improved bearing assembly in which the inner bearing member is permitted to float with the normal axial movement of the shaft with which the bearing is associated, and the outer bearing member is fixed relative to the inner member for supporting the shaft transversely of its axis of rotation and permitting adjustment of the bearing rollers without creating internal stresses in the bearing.

The invention consists in an inner bearing member having a cylindrical race on its outer periphery, concentric with the axis of the bearing, an outer bearing member having a conical race and a thrust rib at its large diameter end, and conical rollers in the raceways provided between the bearing members wherein the conical rollers have their apices on the surface of the cylindrical race. The invention further consists in the parts and combinations of parts making up the present bearing assembly, as hereinafter described in connection with the accompanying drawings.

Figure 1:
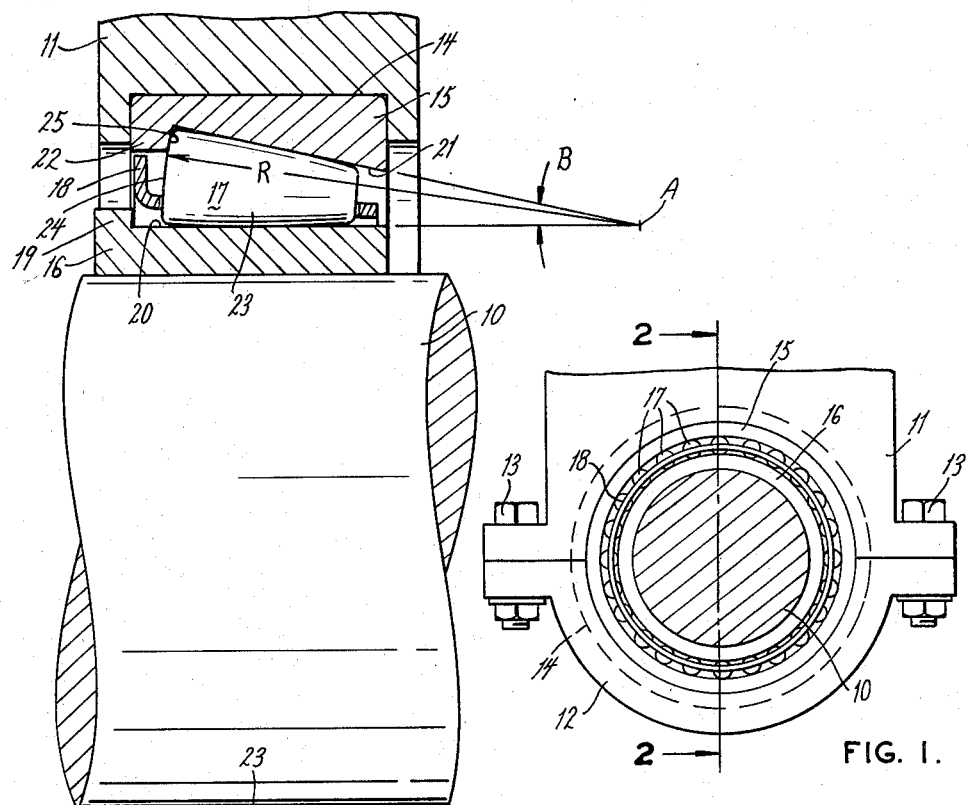
Fig. 1 is an end elevational view of the present improved bearing shown in combination with a shaft hanger, in which the shaft supported by the bearing is disclosed in transverse section.

In the drawings, the shaft 10 is shown supported by a two part shaft hanger consisting of an upper bracket portion 11 and a lower removable cap portion 12 suitably secured by bolt elements 13. The hanger parts 11 and 12 are internally formed (Fig. 2) to provide an annular seat 14 for the outer bearing member or cup 15. The inner bearing member 16 is adapted to receive the shaft 10, and a series of conical rollers 17 are positioned between the bearing members 15 and 16. A roller cage structure 18 of usual form is provided for maintaining the rollers in assembly.

Figure 2:
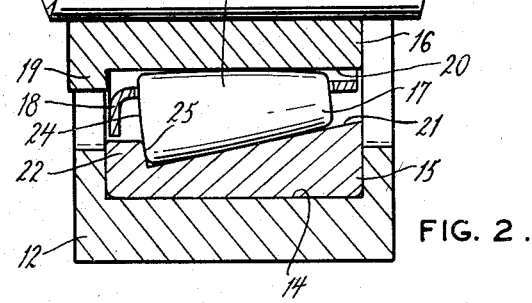
Fig. 2 is a greatly enlarged longitudinal sectional elevation of the bearing assembly wherein the characteristics of the bearing are shown to advantage.

Referring to Fig. 2, it can be seen that the inner bearing member or race ring 16 is formed with a cylindrical race 20 concentric with the shaft axis and located on its outer periphery. It is apparent that the outer bearing member or race ring 15 is the only part of the bearing provided with a conical race. The conical race in the outer member 15 is indicated at 21, and it is further provided with a thrust rib 22 at the large diameter end thereof.

The rollers 17 of the bearing assembly are conically formed and are further longitudinally crowned so that the portion 23 of the rollers is at all times in running engagement between the races of the inner and outer bearing members which tends to reduce the skewing action of the rollers. The rollers 17 are further formed so that the apex point A (see Fig. 2) falls on the cylindrical race 20 of the inner bearing member 16, or on a projection of the cylindrical race surface, as is indicated by the construction line. In a bearing assembly of this character, the roller angle indicated at B is equal to one half the included angle of the outer conical race 21. In order further to minimize the tendency of the rollers to skew or turn out of proper alignment, the large diameter end surface 24 of the rollers 17 and the thrust rib surface 25 are spherically shaped and have a radius R which is equal to the apex length of the roller. The combination of the slight crowning of each of the rollers 17 and the provision of similar or spherical mating surfaces at the large diameter end of the rollers and at the thrust rib surface 25 minimizes the tendency for the rollers to skew or travel out of the proper and intended alignment in the raceways.

Since the present bearing will support only radial loads, the rollers 17 create a thrust at the outer bearing member 15 which is counteracted by the thrust rib 22. This, therefore, permits the inner bearing member 16 to move axially, within permissible limits, so that the bearing assembly supports radial loads and, at the same time, permits axial floating adjustment of the inner bearing member relative to the fixed outer bearing member.

The permissible axial floating movement of the bearing member 16 with the shaft 10 is determined by the spaced location of the large diameter roller ends 24 and a thrust ring 19 (Fig. 2) integrally formed with the cylindrical bearing member 16. The inner annular face of the ring 19 against which the roller ends 24 abut is shaped to conform thereto, as is indicated. The ring 19 limits axial movement in one direction, and acts to cause the rollers 17 to wedge or move relative to the inner and outer bearing members 16 and 15 respectively. This wedging action results in the axial thrust in the shaft 10 being passed into the radial bearing surfaces in the manner of a conventional tapered roller bearing.

Figure 3:
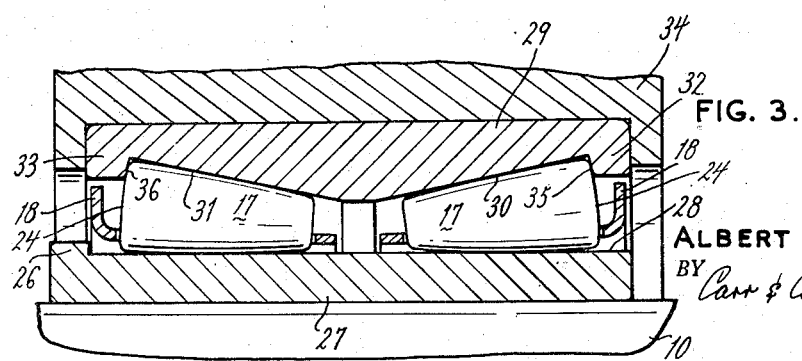
Fig. 3 is an enlarged fragmentary sectional elevation of a modified bearing assembly of the double row roller type.

Referring to Fig. 3, the presently improved bearing is disclosed in connection with a double row bearing assembly having an inner bearing member 27 provided with a concentric cylindrical race 28 on its outer periphery, an outer bearing member 29 having oppositely directed conical races 30 and 31, and adjacent thrust ribs 32 and 33 respectively, a series of rollers 17 for the conical race 30 and a second series of rollers 17 for the conical race 31. The rollers 17 have been described in connection with Figs. 1 and 2, and each series is maintained in assembly by the usual cage structure 18. Shaft 10 is received in the inner bearing member 27 and the outer bearing member 29 is suitably mounted in a shaft hanger structure 34 of a type similar to that shown in connection with Fig. 1. The inner bearing member 27 is axially coextensive with the outer bearing member 29.

The characteristics of the double row bearing assembly are substantially identical with that described in connection with the bearing of Fig. 2. It is important to point out here that the apex point of each of the rollers of the two series thereof in Fig. 3 lies on the cylindrical race 28 of the inner bearing member 27, or a projection thereof. Each of the rollers is formed with a slight longitudinal crown to minimize skewing tendencies, and the inner surfaces 35 and 36 on the outer bearing member thrust ribs 32 and 33 are spherically formed to match with the similar surface 24 on the large diameter ends of the rollers. These spherically formed matching surfaces are constructed on a radius which is equal to the apex length of the roller.

It is also pointed out in Fig. 3, that the cylindrical bearing member 27 is provided with a thrust ring 26 of the character described at 19 in Fig. 2. The ring 26 limits axial thrust movement of the member 27 by causing the adjacent series of rollers 17 to take the thrust and pass it into the members 27 and 29 as radial loads. Axial thrust in an opposite direction along member 27 is taken by the same character of ring 26 in another similar bearing assembly (not shown) or by a ring at the right hand end of member 27.

Having now described my invention in connection with preferred embodiments thereof, I wish it to be understood that modifications may be made therein, without departing from the spirit and scope of the invention as defined in the appended claims.

I claim:

1. In a roller bearing for supporting a rotatable shaft for axial movement relative to a support for the bearing, the combination of an inner race ring secured to the shaft, said inner race ring having a cylindrical race, an outer race ring secured to the support so as to be stationary relative to the shaft, said outer race ring having a conical race, a series of substantially conical rollers disposed between said races, each roller having its apex point on the surface of said cylindrical race or a projection of such surface, and each roller being longitudinally crowned to provide a central portion in running contact at all times between said races, and a thrust rib integrally formed at the large diameter end of said outer race, said thrust rib having a spherical thrust face and the largest ends of said rollers having matching thrust faces engaging said thrust rib face for taking up axial thrust.

2. A roller bearing for supporting a rotatable shaft from a support for axial movement relative to the support, said bearing comprising an outer ring, an inner ring disposed within the outer ring in spaced and concentric relation thereto, said inner ring having an inner bore of a continuously even diameter throughout its length adapting it to fit tightly about a shaft and having an outer surface concentric with and parallel to the wall of the inner bore longitudinally thereof, an outstanding annular flange integral with the inner ring and extending entirely about one end thereof and projecting radially therefrom, said outer ring being of a length substantially corresponding to the distance between the flange and the other end of the inner ring and at its end corresponding to the flanged end of the inner ring being formed internally with an annular thrust flange integral with the outer ring and having a concaved inner side face arcuate transversely, the outer ring having an inner surface extending at an incline from the inner edge of the inner side face of the thrust flange to the other end of the outer ring, a carrier between the inner and outer rings, and conical rollers spaced from each other circumferentially of the carrier and having large end faces diametrically arcuate at all points and having marginal portions bearing against the transversely arcuate inner side face of said thrust flange, said rollers being tapered towards their other ends and having side surfaces longitudinally crowned and contacting the outer surface of the inner ring and the sloping inner surface of the outer ring.

ALBERT L. BERGSTROM.

References Cited in the file of this patent

UNITED STATES PATENTS

| Number | Name | Date |
|---|---|---|
| 169,864 | Teahl | Nov. 9, 1875 |
| 1,196,264 | Modler | Aug. 29, 1916 |
| 2,010,108 | Riblet | Aug. 6, 1935 |
| 2,031,093 | Bender et al. | Feb. 18, 1936 |
| 2,071,628 | Hedgcock | Feb. 23, 1937 |

FOREIGN PATENTS

| Number | Country | Date |
|---|---|---|
| 496,492 | Germany | Apr. 22, 1930 |